United States Patent
Uchida (10) Patent No.: US 7,039,307 B2
(45) Date of Patent: May 2, 2006

(54) DIGITAL STILL CAMERA, IMAGING METHOD, AND EXPOSURE DECISION METHOD

(75) Inventor: Mitsuhiro Uchida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 431 days.

(21) Appl. No.: 10/633,280

(22) Filed: Aug. 4, 2003

(65) Prior Publication Data

US 2006/0029382 A1    Feb. 9, 2006

(30) Foreign Application Priority Data

Aug. 5, 2002  (JP)  ............... 2002-227413

(51) Int. Cl.
  G03B 15/05  (2006.01)
  G03B 41/00  (2006.01)
  H04N 5/262  (2006.01)
(52) U.S. Cl. .................. 396/67; 396/166; 396/322; 348/223.1; 348/229.1; 348/239; 348/362; 348/371
(58) Field of Classification Search .............. 396/65, 396/67, 159, 166, 168, 322; 348/218.1, 223.1, 348/229.1, 239, 362, 370, 371
See application file for complete search history.

(56) References Cited

U.S. PATENT DOCUMENTS

| | | | | |
|---|---|---|---|---|
| 5,162,914 A | * | 11/1992 | Takahashi et al. | 348/229.1 |
| 5,309,243 A | * | 5/1994 | Tsai | 348/221.1 |
| 5,751,348 A | * | 5/1998 | Inuiya et al. | 348/220.1 |
| 5,808,681 A | * | 9/1998 | Kitajima | 348/371 |
| 6,693,673 B1 | * | 2/2004 | Tanaka et al. | 348/371 |
| 6,744,471 B1 | * | 6/2004 | Kakinuma et al. | 348/371 |

FOREIGN PATENT DOCUMENTS

JP  11-298908 A  10/1999

* cited by examiner

*Primary Examiner*—W. B. Perkey
(74) *Attorney, Agent, or Firm*—Birch, Stewart, Kolasch & Birch, LLP (57) ABSTRACT

A digital still camera has a function to perform first and second exposures in a single imaging sequence. In the first exposure, imaging conditions are determined to obtain proper exposure amount of the background with available light. Then, the second exposure is carried out with the flashlight to illuminate the main subject. The photographic sensitivity, the shutter speed, and the aperture value for the second exposure are determined such that the exposure value in the second exposure is under-exposure by two steps or more, compared to that in the first exposure. Images obtained by first and second exposures are synthesized to obtain a composite image.

13 Claims, 7 Drawing Sheets

| BACK-GROUND | FIRST EXPOSURE | | | SECOND EXPOSURE (SUBJECT DISTANCE: 2m) | | | | |
|---|---|---|---|---|---|---|---|---|
| | PHOTOGRAPHIC SENSITIVITY | APERTURE VALUE (f) | SHUTTER SPEED (SEC.) | PHOTOGRAPHIC SENSITIVITY | APERTURE VALUE (f) | SHUTTER SPEED (SEC.) | $LV_2$ |
| LV10 | 100 | 4 | 1/60 | 100 | 4 | 1/1000 | 14 |
| LV9 | 100 | 3.5 | 1/45 | 100 | 3.5 | 1/1000 | 13 |
| LV8 | 100 | 2.8 | 1/30 | 100 | 2.8 | 1/1000 | 12 |
| LV7 | 200 | 2.8 | 1/30 | 100 | 2.8 | 1/1000 | 12 |
| LV6 | 400 | 2.8 | 1/30 | 100 | 2.8 | 1/1000 | 12 |
| LV5 | 800 | 2.8 | 1/30 | 100 | 2.8 | 1/1000 | 12 |
| LV4 AND UNDER | 1600 | 2.8 | 1/30 | 100 | 2.8 | 1/1000 | 12 |

FIG. 7

SECOND EXPOSURE (BACKGROUND: $LV_1 = 8$)

| SUBJECT DISTANCE | SENSITIVITY (ISO) | $LV_2$ | $\Delta LV = LV_2 - LV_1$ |
|---|---|---|---|
| 2m | 100 | 12 | +4 |
| 3m | 100 | 12 | +4 |
| 5m | 200 | 11 | +3 |
| 10m | 400 | 10 | +2 |
| 20m | 400 | 10 | +2 |

DIGITAL STILL CAMERA, IMAGING METHOD, AND EXPOSURE DECISION METHOD

This nonprovisional application claims priority under 35 U.S.C. § 119(a) on Patent Application No(s). 2002-227413 filed in JAPAN on Aug. 5, 2002, which is (are) herein incorporated by reference.

BACKGROUND OF THE INVENTION

1. Field of the Invention

The present invention relates to a digital still camera with a flash device.

2. Background Arts

A digital still camera has a white balance adjustment function to correct the color balance of an image taken under various light sources. For example, since a main subject illuminated by flashlight even under illumination of an artificial light source, a taken image is usually subject to color balance correction by use of a prescribed adjustment value for the flashlight.

However, when available light, such as illumination light from the artificial light source, is strong or when the flashlight is weak, the main subject is influenced by available light. As a result, the color balance of the taken image becomes undesirable.

In order to obtain the image with desirable white balance, an attempt has made to determine a correct adjustment value for white balance correction by obtaining the ratio of the flashlight to available light illuminated on the main subject.

In order to calculate the ratio, however, it is necessary to obtain much information, such as the distance between the digital still camera and the main subject, the position of the main subject, brightness of the main subject, the amount of the flashlight, and the like. A digital still camera with sensors to obtain such information is very expensive.

Some digital still camera sets the adjustment value such that the corrected value is slightly smaller than that in photography without the flashlight. In that case, however, since such adjustment value is not proper to correct the white balance, the main subject in the taken image tends to have undesirable color.

For the purpose of solving the above problem, Japanese Patent Laid-Open Publication No. 11-298908 describes an image processing method in which a subject exposure with the flashlight and a background exposure with the available light are carried out in a single photography. In the subject exposure, the digital camera emits flashlight to illuminate the main subject with the correct brightness. The white balance of the subject image is adjusted by the adjustment value for the flashlight. In the background exposure, an exposure is carried out with available light, and the white balance of the background image is adjusted by the adjustment value for available light. Then, both images are synthesized to obtain a composite image in which the white balance of the main subject and the background are properly adjusted.

However, in the above image processing method, it is presumed that the main subject is extremely dark compared to the background. When brightness of the main subject is not largely different from brightness of the background, it is difficult to remove an influence of available light on the main subject. Moreover, the main subject in the taken image tends to be overexposed because of the flashlight and available light illuminated on the main subject. Accordingly, the image processing method is not applicable to indoor photography.

SUMMARY OF THE INVENTION

An object of the present invention is to provide a digital still camera which enables proper white balance correction of the subject image and the background image under various photography conditions.

To achieve the above object, an exposure value in exposing a main subject is determined to obtain an underexposure value by two steps or more, compared to that in the background exposure.

When carrying out a first exposure without a flashlight and a second exposure with the flashlight, imaging conditions in the first exposure are initially determined to obtain proper exposure amount according to measured subject brightness. Then, imaging conditions in the second exposure are determined to satisfy the following formula;

$$AV_1 + TV_1 - SV_1 + 2 \leq AV_2 + TV_2 - SV_2.$$

$SV_1$, $AV_1$, and $TV_1$ represent each APEX value of a photographic sensitivity, an aperture value, and a shutter speed in a first exposure, and $SV_2$, $AV_2$, and $TV_2$ represent each APEX value of the photographic sensitivity, the aperture value, and the shutter speed in the second exposure.

White balance of the image obtained in the first exposure is adjusted by using a parameter according to available light. White balance of the image obtained in the second exposure is adjusted by using a parameter according to flashlight. Density of a composite image obtained by synthesizing the images in the first and the second exposures is corrected such that the density of the main subject is properly corrected.

In a preferable embodiment, the second shutter speed is equal to or less than 1/500 sec. The upper limit of the first photographic sensitivity is determined within a range from ISO 640 to ISO 1600. It is preferable to determine the imaging conditions to satisfy the following formulae;

$$AV_1 + TV_1 - SV_1 5 \leq 6$$

$$AV_2 + TV_2 - SV_2 5 \geq 10$$

The photographic sensitivity in the second exposure is preferably determined such that the measured subject distance remains within the flashlight effective distance. In that case, when the following formula is not satisfied, the photographic sensitivity in the second exposure is decreased to satisfy the formula;

$$AV_1 + TV_1 - SV_1 + 2 \leq AV_2 + TV_2 - SV_2.$$

According to the present invention, exposure parameters in the first exposure and those in the second exposure are optimized respectively. Since the main subject is not influenced by available light in the flash photography, it becomes possible to obtain the image of the main subject with proper color balance.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention.

In the drawings, the same reference numerals designate like or corresponding parts throughout the several views, and wherein.

DETAILED DESCRIPTION OF THE EMBODIMENTS

Figure 1:
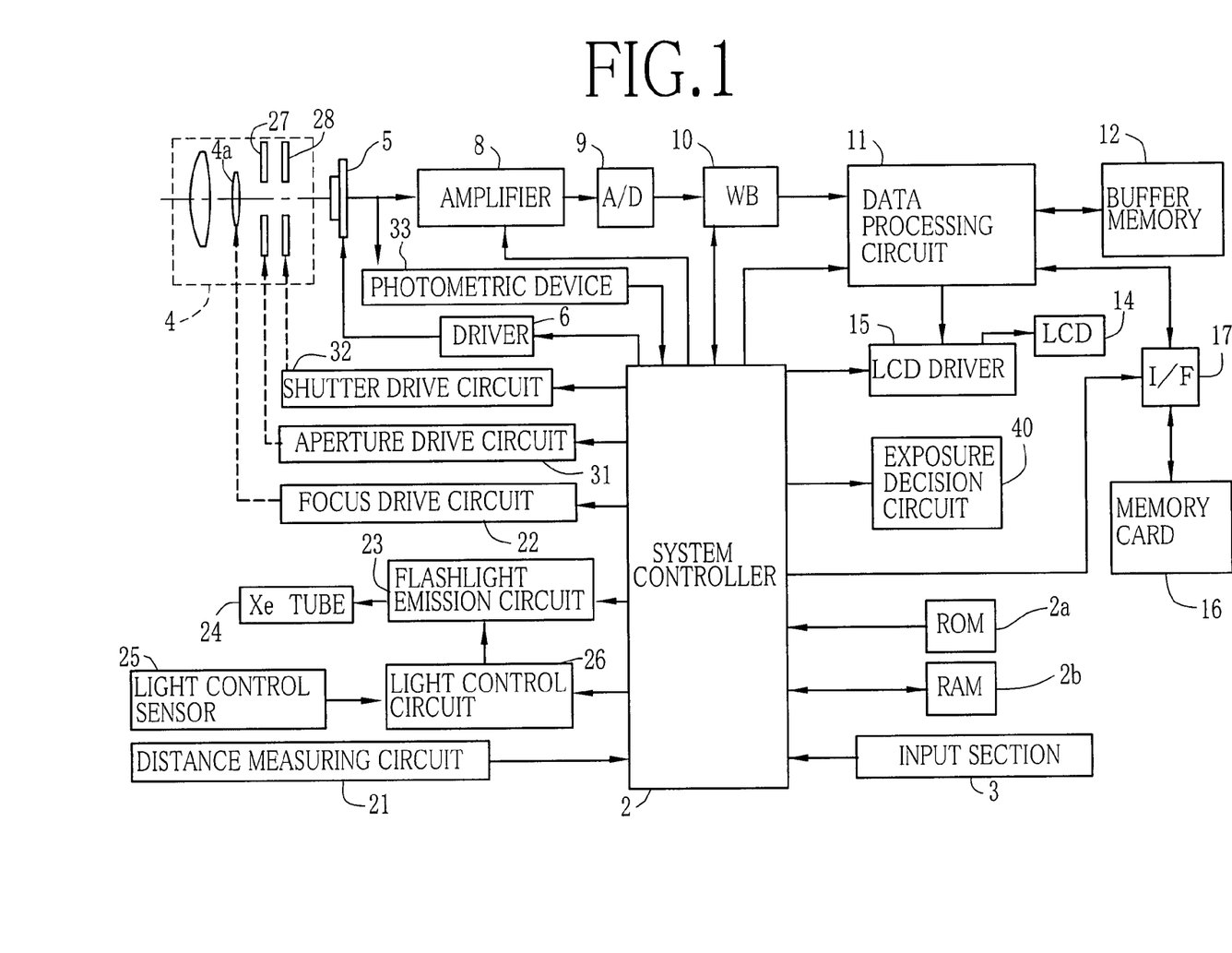
FIG. 1 is a block diagram illustrating the structure of a digital still camera.

Referring to FIG. 1, a digital still camera comprises a photometric device 33, a system controller 2 as exposure determining means, a WB (White Balance) circuit 10, a data processing circuit 11, a flashlight emission circuit 23, and a distance measuring circuit 21. The system controller 2 controls each circuit of the digital still camera in response to an operation signal input from an input section 3. The input section 3 is constituted of various operation members such as a release button and a mode selection member. A ROM 2a, connected to the system controller 2, stores a program and parameters for carrying out various sequences including a photographic sequence particular to this invention. The ROM 2a stores other data, such as white balance adjustment values for various light sources. A RAM 2b, connected to the system controller 2, is utilized as a work memory for temporarily memorizing data necessary for carrying out the photographic sequence.

In a photography mode, a user can select either a normal photography mode without flashlight or a flashlight photography mode with flashlight by operating the input section 3. In the normal photography mode, an exposure is carried out in a single photography sequence in response to a depression of a release button in the same manner as a conventional digital still camera. In the flashlight photography mode, two exposures (hereinafter referred to as a first exposure and a second exposure) are carried out in a single photography sequence. In the flashlight photography mode, images obtained by the first and the second exposures are synthesized to create one taken image.

A CCD image sensor 5 is disposed behind a taking lens 4. A driver 6 of the CCD image sensor 5 controls the electrical charge time (the shutter speed of the electric shutter), the operation to transfer the charge in each pixel, and the like. Thereby, the CCD image sensor 5 outputs an electrical imaging signal which was converted from an optical object image.

In a photoreceptor surface of a CCD image sensor 5, plural color filters of R, G, and B are arranged in a matrix pattern. After amplification to a suitable level by an amplifier 8, the imaging signal including components of R, G, and B is converted to image data of red, green, and blue by an A/D converter 9. The sensitivity of a digital still camera is determined by the gain of the amplifier 8 that is set by the system controller 2.

The WB (White Balance) circuit 10 is constituted of a multiplier and light-source judgment device. The multiplier sets one of three colors (red, green, and blue) as the standard color. Then, the multiplier increases or decreases the gradation values of other two colors based on the gradation value of the standard color and the white balance adjustment value. The light-source judgment device determines the type of the light source of available light from image data of each color. White balance adjustment values for the flashlight and various kinds of available light are previously stored in the ROM 2a in the manufacture. The white balance adjustment value in the ROM 2a is read and set in the WB circuit 10 by the system controller 2.

Except for the second exposure in the flashlight photography mode, the WB circuit 10 adjusts the white balance of the image by so-called auto white balance function. The light source judgment device determines the type of the light source. Then, the white balance adjustment value is set in the multiplier based on the type of the light source. Thus, the WB circuit 10 can adjust the white balance in accordance with the type of the light source in taking moving images for framing operation, in the normal photography mode or in taking the first exposure in the flashlight photography mode.

In the second exposure in the flashlight photography mode, the system controller 2 sets the white balance adjustment value for the flashlight. Each multiplier outputs a value obtained by multiplying the gradation values of two colors by the white balance adjustment value set in the multiplier, so that the white balance is appropriately corrected for flash photography.

The white balance may be adjusted by increasing or decreasing the analog signal level instead of adjusting the gradation value in image data. In that case, each analog signal of R, G, and B, is generated from the image signal. White Balance is adjusted by increasing or decreasing the gains to amplify analog signals of two colors based on the white balance adjustment value.

Image data from the WB circuit 10 is sent to the data processing circuit 11. The data processing circuit 11 carries out normal image processes such as gamma correction, sharpness correction, color correction, and image compression process to compress image data. Further, in the flashlight photography mode, a synthesize process and a digital gain process are carried out.

The synthesize process is carried out by simply adding each image data obtained by first and second exposures. When the main subject is overexposed by available light and the flashlight, the density of the main subject is properly corrected by the digital gain process.

In the normal photography mode, image compression is carried out after the normal image process. In the flashlight photography mode, the image compression is carried out after the synthesize process, the digital gain process, and the normal image process.

A buffer memory 12 is connected to the data processing circuit 11. In the flashlight photography mode, image data of first and second exposure is written in the buffer memory 12. In the synthesis process, image data in the buffer memory 12 is read by the image processing circuit 11.

An LCD 14 functions as an electronic viewfinder for displaying the full-color subject image, taken by the CCD image sensor 5 through the taking lens 4, in real time manner. In addition, the LCD 14 is used for displaying the photographed image. Under the photography mode, the CCD image sensor 5 takes the subject images continuously to obtain image data. After image processing in the data processing circuit 11, image data is sent to the LCD driver 15 sequentially. Thereby, moving subject image is displayed in the LCD 14.

A memory card 16 as a recording medium for recording the images is loaded in the digital still camera. When image data is compressed in the image processing circuit 11, an interface circuit 17 stores compressed image data in the memory card 16. In a reproduction mode, a user can operate the input section 3 to choose an image in the memory card 16.

Image data corresponding to the selected image is read from the memory card 16 through the interface circuit 17. After image data is decompressed in the data processing circuit 11, decompressed image data is sent to the CCD driver 15. Thereby, image stored in the memory card 16 is displayed in the LCD 14 as a still image.

A distance-measuring circuit 21 measures a subject distance of the main subject, and sends subject distance data to the system controller 2. The system controller 2 actuates a focus drive circuit 22 based on subject distance data to focus on the main subject by moving a focusing lens 4a included in the taking lens 4 back and forth. Subject distance data is also used for determining the photographic sensitivity under the flashlight photography mode.

A passive autofocusing system or an active autofocusing system may be used for the distance-measuring circuit 21. In adopting the passive autofocusing system, it is preferable to incorporate a function for emitting illumination light, so that the distance-measuring circuit 21 can obtain subject distance information even when the subject brightness is low. In focusing the taking lens 4 by phase difference detecting method or contrast detection method, for example, it is possible to obtain the subject distance by detecting a focal position of the taking lens 4 by use of an encoder.

An emission circuit 23, an Xe tube 24, a light-control sensor 25, a light-control circuit 26 constitutes a flash device with the automatic light amount control function. The emission circuit 23 emits the Xe tube 24 at the second exposure in the flashlight photography mode. Thereby, the flashlight discharged from the Xe tube 24 illuminates the subject. The light-control sensor 25 receives the flashlight reflected from the subject, and the received light amount is integrated in the light-control circuit 26. The light-control circuit 26 stops light emission in the Xe tube 24 when the integrated value of the received light amount reaches a flashlight completion value. The flashlight completion value is determined by the system controller 2 based on the aperture value and the photographic sensitivity used for the second exposure, and is set in the light-control circuit 26.

In the taking lens 4 are incorporated an aperture blade 27 and a shutter blade 28. The aperture blade 27 and the shutter blade 28 are driven respectively by an aperture drive circuit 31 and a shutter drive circuit 32 which are controlled by the system controller 2. The photometric device 33 detects subject brightness from the level of the image signal output from the CCD image sensor 5, and sends subject brightness data to the system controller 2. Subject brightness data is used to determine the photographic sensitivity, the shutter speed, and the aperture value. In the normal photography mode, the system controller 2 determines the photographic sensitivity, the shutter speed and the aperture value so as to make an appropriate subject brightness.

The first exposure in the flashlight photography mode is carried out by available light. An object of the first exposure is to describe the background with correct brightness. Accordingly, in the first exposure, a correct combination of the photographic sensitivity, the aperture value, and the shutter speed is determined by the exposure decision circuit 40 according to background brightness. Subject brightness measured by the photometric device 33 is used as background brightness. Note that background brightness includes brightness of the main subject in a strict sense, since subject brightness data is used in the first exposure.

The combination of the photographic sensitivity, the aperture value, and the shutter speed for the first exposure may be determined in various methods. The shutter speed is preferably determined in consideration of a camera shake. The photographic sensitivity is preferably determined in consideration of degradation in image quality in response to increase in the sensitivity. Namely, in the first exposure, it is preferable to set the lower limit of the shutter speed to prevent the camera shake caused by low shutter speed. The commonly used shutter speed, such as 1/30 sec., 1/60 sec., can be used as the lower limit of the shutter speed. It is preferable to determine in consideration of the focal distance of the taking lens. Further, it is preferable to set an upper limit of the photographic sensitivity in order to prevent degradation of the image quality in response to the increase in the photographic sensitivity (the gain in amplifier 8). The optimum value for the upper limit of the photographic sensitivity depends on the CCD image sensor used for the photography. It is preferable to set the photographic sensitivity at ISO 640 or more in the present invention. In this example, the lower limit of the shutter speed is set at 1/30 sec., and the upper limit of the photographic sensitivity is set at ISO 1600.

As mentioned above, the object of the present invention is to describe the background with proper brightness. Accordingly, it is preferable that the digital camera has sufficient system sensitivity in various conceivable photographed scenes. The system sensitivity ($LV_{min}$) obtained by the following formula (1) is preferably 6 or below, more preferably 5 or below, since the typical artificial illumination is 5 to 6 [EV] or over at ISO 100.

$$LV_{min} = AV_{min} + TV_{min} - SV_{max} + 5 \qquad (1)$$

In the above formula (1), $AV_{min}$ is a minimum possible aperture value F by APEX value. $TV_{min}$ is the lowest shutter speed by APEX value that can prevent the camera shake. $SV_{max}$ is the upper limit of the photographic sensitivity by APEX value, set as above. Further, the LV value is used for representing the system sensitivity in the left side of the formula (1). This LV corresponds to BV by APEX value. The LV is larger than the BV by 5 since the SV at ISO 100 is set to be "0". In the right side of the above formula (1), the APEX value ($SV_{max}$) is 5 at ISO 100. Accordingly, the LV is obtained by adding 5 to "$AV_{min} + TV_{min} - SV_{max}$".

The second exposure begins right after the CCD image sensor 5 starts to transfer the pixel charges obtained in the first exposure. The object of the second exposure is to eliminate the effect of available light as much as possible for describing the main subject with the flashlight. The exposure decision circuit 40 calculates the photographic sensitivity such that the main subject is properly exposed by the flashlight. The condition for eliminating the effect of available light is given priority in the calculation.

In order to eliminate the effect of available light as much as possible in the second exposure, it is necessary to make $LV_2$ obtained by the formula (3) sufficiently large in comparison with $LV_1$ to satisfy the formula (4).

$$LV_1 = AV_1 + TV_1 - SV_1 + 5 \quad (2)$$

$$LV_2 = AV_2 + TV_2 - SV_2 + 5 \quad (3)$$

$$LV_1 + 2 \leq LV_2 \quad (4)$$

$AV_1$, $TV_1$, and $SV_1$ in formula (2) represent APEX values for the aperture value, the shutter speed, and the photographic sensitivity for the first exposure. $AV_2$, $TV_2$, and $SV_2$ in formula (3) represent APEX values for the aperture value, the shutter speed, and the photographic sensitivity for the second exposure. Further, $LV_1$ represents proper background brightness in the first exposure. On the other hand, $LV_2$ represents the proper brightness of the main subject in the second exposure. The formula (4) signifies that the exposure value in the second exposure is controlled such that the brightness of the main subject becomes underexposure by 2 EV or more compared to the background brightness. Thereby, the effect of available light to the main subject is eliminated in the second exposure.

By applying the high shutter speed, exposure amount of available light can be reduced without changing the exposure amount of the flashlight. Therefore, it is preferable to apply as high shutter speed as possible for the second exposure. The preferable shutter speed is 1/500 sec. or faster, more preferably 1/1000 sec. or faster. Note that the digital camera has to complete emitting the flashlight while the shutter is open in the second exposure. Further, since the object of the second exposure is to describe the main subject, it is preferable to photograph as high image quality as possible. Thus, it is preferable to carry out the second exposure in a low sensitivity which is superior in S/N ratio.

In this embodiment, the shutter speed in the second exposure is fixed at 1/1000 sec. The aperture value in the second exposure is the same as that in the first exposure. The photographic sensitivity is set to obtain proper exposure amount of the subject at the subject distance, measured prior to photography, by use of the flashlight. That is, the photographic sensitivity is temporarily determined such that the subject distance is equal to or less than the effective distance obtained by dividing the guide number by the aperture value. Then the system controller 2 checks if the photographic sensitivity satisfies the formula (4). If the formula (4) is satisfied, it is set as that in the second exposure. When the formula (4) is not satisfied, the photographic sensitivity decreases gradually until it satisfies the formula (4). Thus, the photographic sensitivity for the second exposure is determined. The aperture value for the second exposure may differ from that of the first exposure. It is also possible to apply full aperture.

Further, in the environment of indoor lighting with the $LV_1$ of 6 or less, the taken image is easily affected by available light. Therefore, $LV_2$ is preferably as large as possible, more preferably 10 or more.

The first exposure is carried out by use of an electronic shutter of the CCD image sensor 5. On the other hand, the electronic shutter and the shutter blade 28 of the CCD image sensor 5 are used for the second exposure. Since the shutter blade 28 does not move between the first and the second exposures, it is possible to shorten the interval between the first exposure and the second exposure and the photographic sequence. Moreover, it is possible to decrease blur of the background and the main subject that is caused by double exposure.

Next, the operation of the above configuration is described. When using the flashlight, the flashlight photography mode is selected, regardless of the intensity of the available light illuminating the background or the main subject. Under the photography mode, the full-color subject image taken by the CCD image sensor 5 is displayed in the LCD 14 as moving subject image in a manner similar to conventional digital still camera. An image is taken after a frame is determined while observing the LCD 14.

Figure 2:
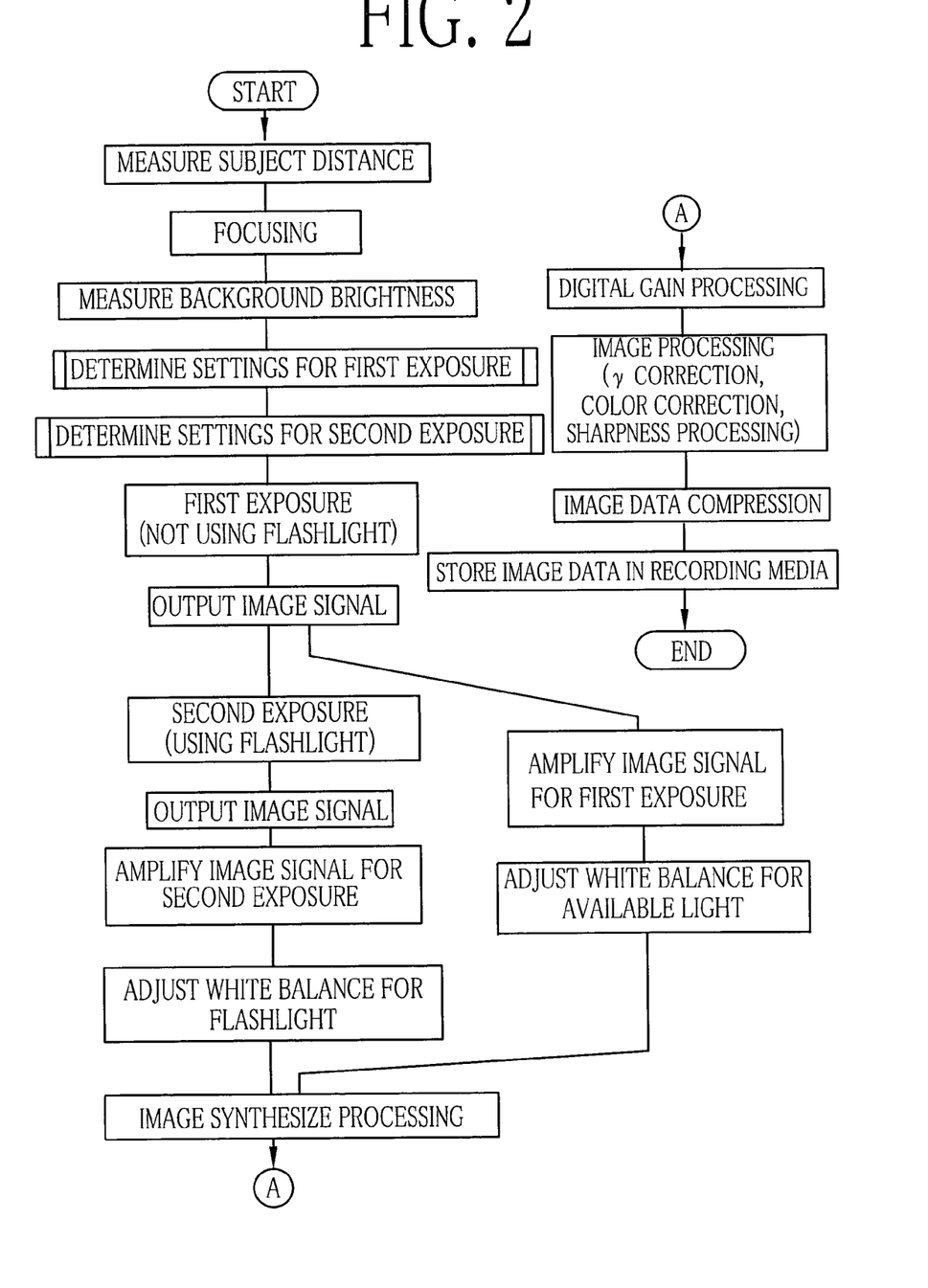
FIG. 2 is a flow chart of an imaging process in a flashlight photography mode.

Referring to FIG. 2, when the release button is pressed, the distance-measuring circuit 21 measures the subject distance and sends subject distance data to the system controller 2. The system controller 2 moves the focusing lens 4a through the focus drive circuit 22 based on subject distance data for focusing the main subject. In this embodiment, the first and the second exposures are carried out in focus of the main subject. However, it may also possible to focus the background in the first exposure, and then on the main subject in the second exposure.

After adjusting the focus of the taking lens 4, the photometric device 33 examines the image signal level sent from the CCD image sensor 5. Thereby, subject brightness, which is the brightness of the background including the main subject, is measured. This information is sent to the exposure decision circuit 40 as subject brightness data. Based on this subject brightness data, the exposure decision circuit 40 determines the settings for the first exposure (the photographic sensitivity, the shutter speed, and the aperture value) such that the proper exposure amount of the background is obtained based on subject brightness data.

Figure 3:
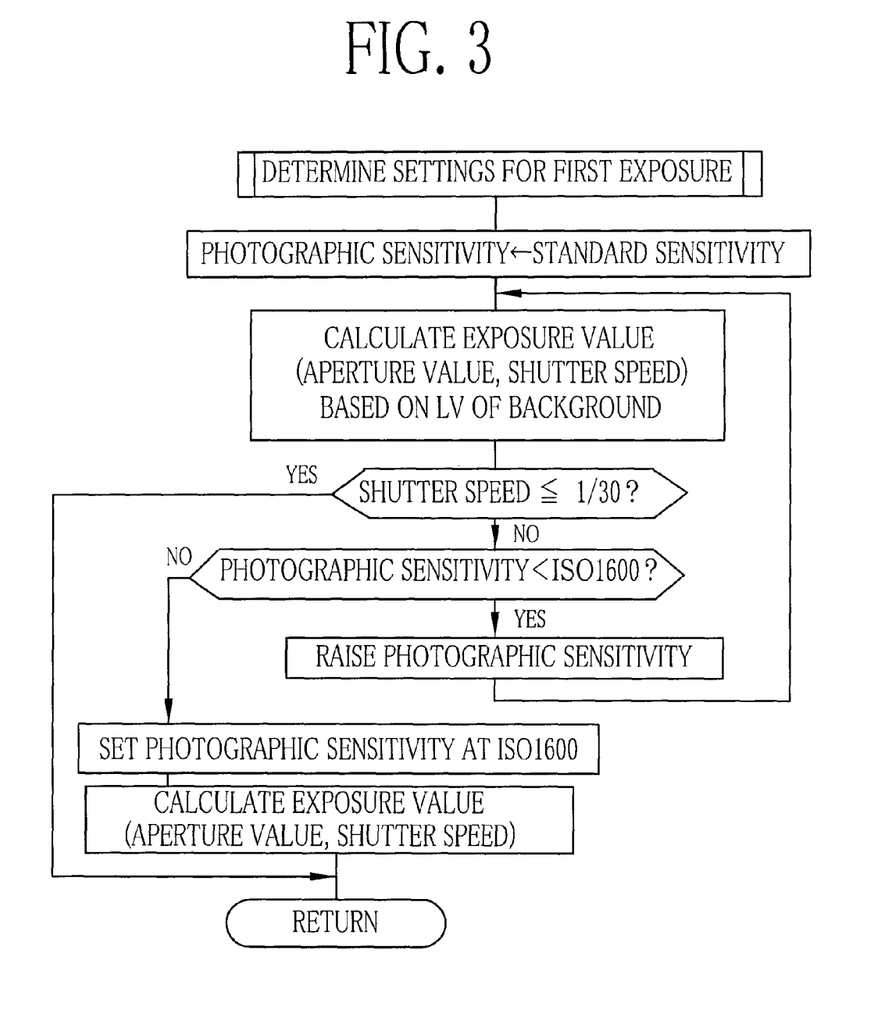
FIG. 3 is a flow chart of the process to determine an aperture value, a shutter speed, and a photographic sensitivity for a first exposure.

Referring to FIG. 3, the standard sensitivity (ISO 100, for example) is initially applied in the first exposure. A combination of the shutter speed and the aperture value for obtaining the proper exposure amount at this photographic sensitivity is determined by predetermined sequence. When the determined shutter speed is lower than 1/30 sec., the photographic sensitivity is gradually increased until the shutter speed reaches 1/30 sec.

It is also possible to adjust the shutter speed by changing the aperture value instead of changing the photographic sensitivity. When the subject brightness is high and the combination of the shutter speed and the aperture value may exceed the controllable range, the photographic sensitivity decreases until the proper exposure amount within the permissible range is obtained. In case that the shutter speed remains lower than 1/30 sec. even though the photographic sensitivity has reached the upper limit (ISO 1600), the photographic sensitivity is set at the upper limit, an aperture value is set at the smallest full-aperture, and the shutter speed is set at the highest speed such that the proper exposure is obtained.

After the settings for the first exposure has been determined as above, the exposure decision circuit 40 determines the settings for the second exposure. In this embodiment, the shutter speed in the second exposure is fixed at 1/1000 sec. The aperture value in the second exposure is the same as that in the first exposure. The photographic sensitivity in the second exposure is determined based on the above shutter speed and the above aperture value.

Figure 4:
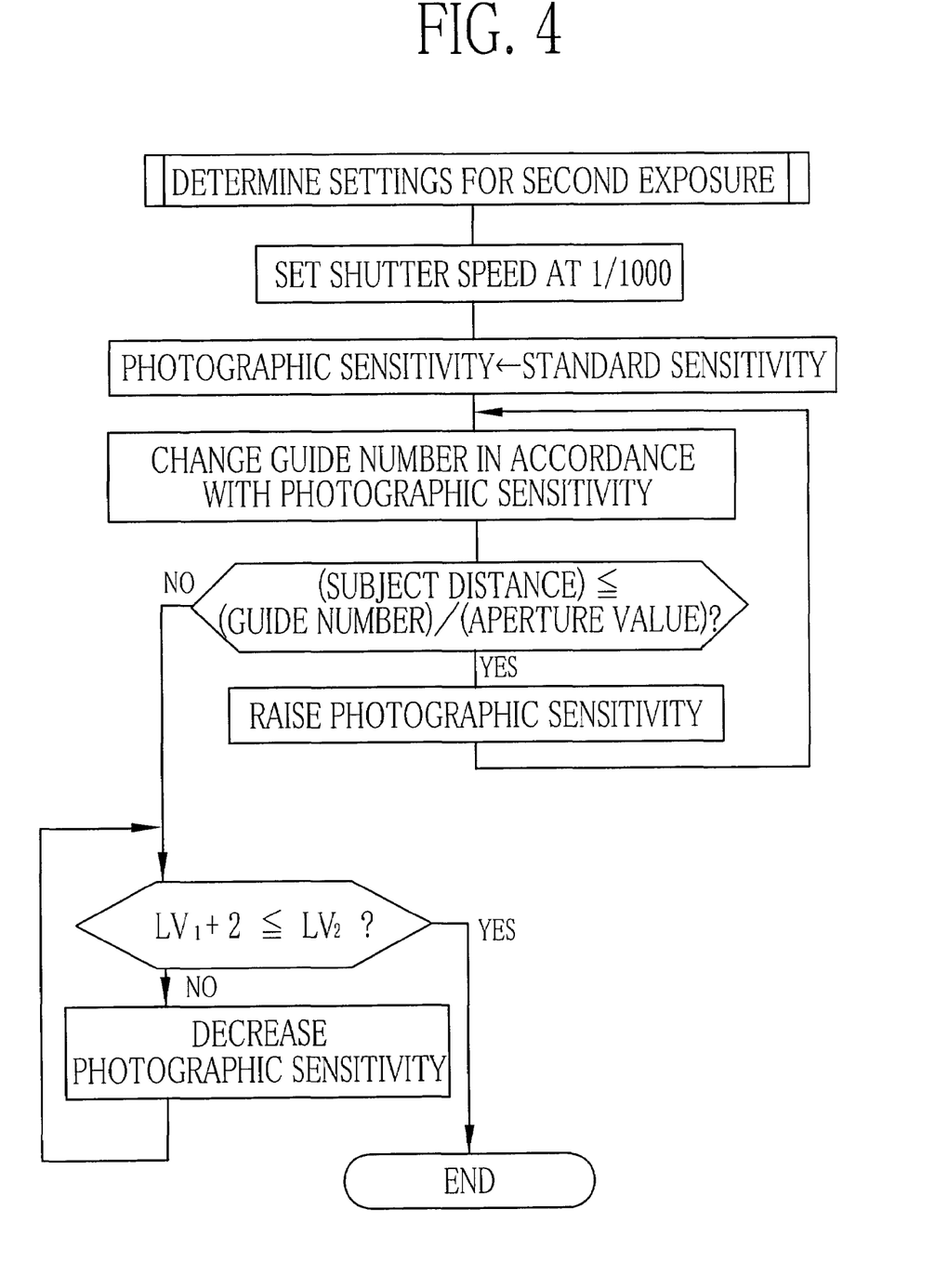
FIG. 4 is a flow chart of the process to determine the aperture value, the shutter speed, and the photographic sensitivity for a second exposure.

Referring to FIG. 4, the exposure decision circuit 40 examines whether the subject distance is equal to or less than the maximum effective distance of the flashlight under the standard photographic sensitivity. The effective distance is obtained by dividing the guide number of the flashlight, which is in accordance with the standard sensitivity, by the aperture value used in the second exposure. Then, the obtained effective distance and the subject distance are compared.

When the subject distance is not equal to or less than the effective distance, the photographic sensitivity is increased by one step, and the guide number is converted according to the photographic sensitivity. Then, the guide number is divided by the aperture value applied in the second exposure to obtain the revised effective distance that is compared with the subject distance. Thus, the photographic sensitivity is gradually increased until the subject distance becomes equal to or less than the effective distance. This photographic sensitivity is regarded as a temporary photographic sensitivity in the second exposure.

After the temporary photographic sensitivity is calculated as above, the exposure decision circuit 40 examines whether the temporary photographic sensitivity satisfies the formula (4). When it satisfies the formula (4), the temporary photographic sensitivity is used in the second exposure. On the other hand, when it does not satisfy the formula (4), the photographic sensitivity is decreased by one step to see if it satisfies the formula (4). Thus, the photographic sensitivity is gradually decreased until it satisfies the formula (4). The photographic sensitivity which satisfies the formula (4) is used in the second exposure.

For example, background brightness based on the photometric measurement is 9 LV (4 BV), the photographic sensitivity in the first exposure is ISO 100, the full aperture is f/2.8, the shutter speed is 1/30 sec., the subject distance is 5 m, and the guide number is GNo. 10 (ISO 100·m). In that case, the photographic sensitivity of ISO 200, which is one level higher, is temporarily used for setting the subject distance equal to or less than the effective distance of the flashlight at the full aperture of f/2.8. The effective distance is 5.05 m at ISO 200 and f/2.8. In the above settings, $LV_1=9$, and $LV_2=12$ are obtained, so that the formula (4) is satisfied. Therefore, the photographic sensitivity of ISO 200 is used in the second exposure.

When the subject distance is 10 m, and other conditions are the same as above, the temporary photographic sensitivity is set at ISO 800 for making the subject distance equal to or less than the effective distance of the flashlight. Further, when the photographic sensitivity is ISO 800 and the aperture value is f/2.8, the effective distance is 10.1 m. However, in this case, the formula (4) is not satisfied, since $LV_2=10$. For that reason, the photographic sensitivity is decreased in one step to satisfy the formula (4). As a result, ISO 400 is used in the second exposure.

After each setting for the first and second exposures is determined as described above, the first exposure is carried out. The exposure decision circuit 40 controls the aperture blade 27 through the aperture drive circuit 31 to set the aperture value for the first exposure. Next, the gain according to the photographic sensitivity in the first exposure is set in the amplifier 8. The system controller 2 sends signals to the WB circuit 10 to retain the white balance adjustment value for the automatic white balance function.

When the release button is pressed, the CCD image sensor 5 takes the image of the subject illuminated by available light concurrently. The WB circuit 10 determines the type of the light source according to the input image data, and sends the result to the system controller 2. Thereby, the system controller sets the white balance adjustment value according to the available light. Therefore, prior to the first exposure, the adjustment value according to available light is retained in the white balance circuit 10.

Figure 5:
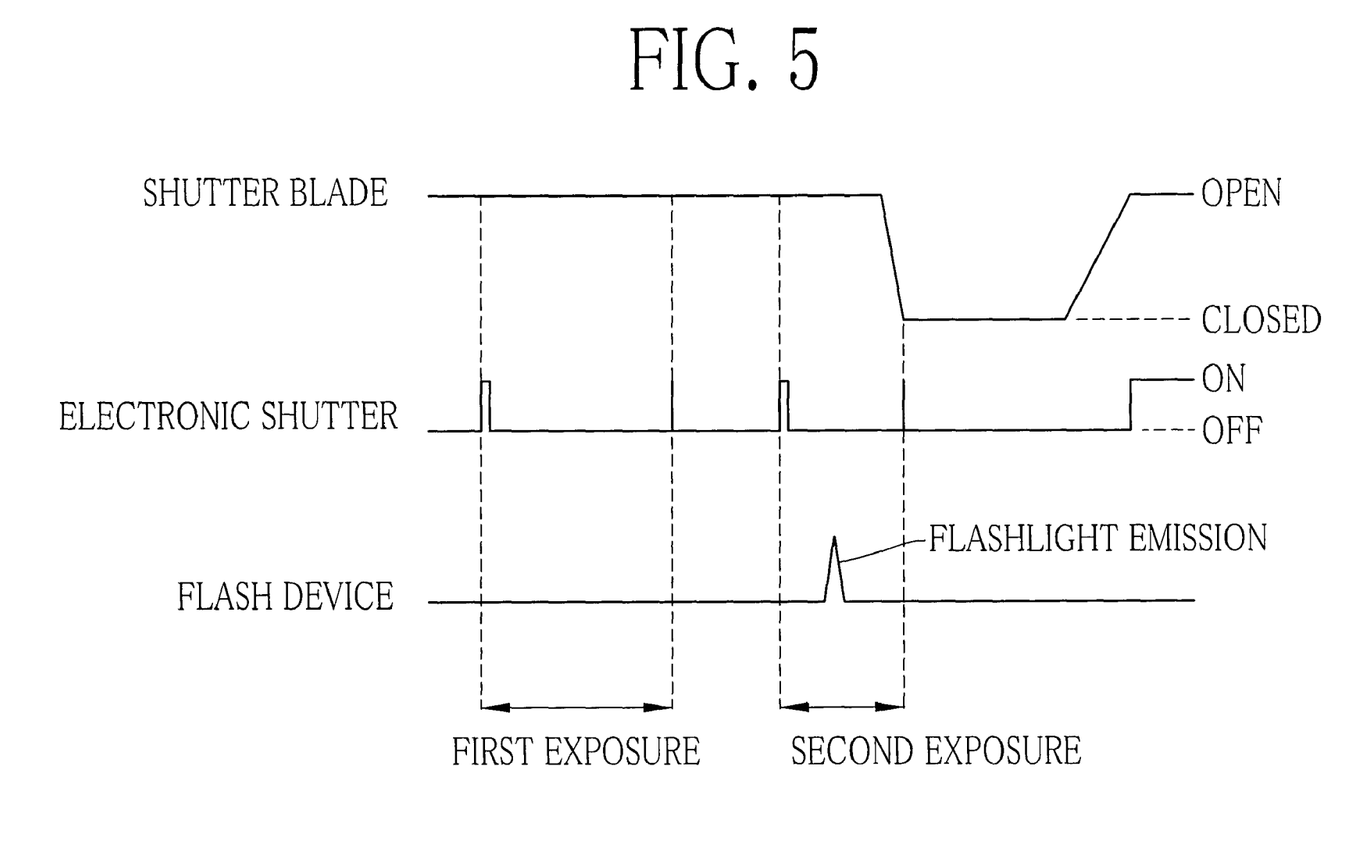
FIG. 5 is a time chart of the operation of an electronic shutter, a shutter blade, and a flash device.

FIG. 5 is a time chart illustrating the operation of an electronic shutter of the CCD image sensor 5, the shutter blade 28, and emission of the flashlight. The electronic shutter of the CCD image sensor 5 is driven to remove unnecessary charge in each pixel. At that time, the shutter blade 28 is open, so that the photographic light is incident upon CCD image sensor through the taking lens 4. Thus, the first exposure is carried out with the predetermined first aperture value.

When the first exposure is carried out for the predetermined first shutter speed, transfer pulses are input to transfer the stored charge in each pixel in a transfer path sequentially. Thereby, the image signal of the first exposure is output from the CCD image sensor 5.

The image signal from the CCD image sensor 5 is amplified in the amplifier 8, and sent to the A/D converter 9. Since the gain according to the photographic sensitivity in the first exposure is set in the amplifier 8, the image signal which corresponds to the photographic sensitivity in the first exposure is output from the amplifier 8. Thereafter, the image signal is converted to image data by the A/D converter 9.

Image data obtained in the first exposure is sent from A/D converter 9 to the WB circuit 10 for white balance correction. Then, image data is written into the buffer memory 12 through the data processing circuit 11. The WB circuit 10, set to achieve proper white balance according to available light, carries out proper white balance correction to the taken background image exposed by available light as the light source in the first exposure.

When the stored charge in each pixel is transferred to the transfer path of the CCD image sensor 5, the electronic shutter is driven to remove unnecessary charge in each pixel. Then, the second exposure is performed for the predetermined time according to the shutter speed, until the shutter blade 28 is closed by the shutter drive circuit 32. Thereby, the second exposure is carried out at the shutter speed of 1/1000 sec. and at the same aperture value as that in the first exposure.

On the other hand, when the electronic shutter of the CCD image sensor 5 is driven to start the second exposure, the system controller 2 gives the trigger signal to the emission circuit 23 to emit the flashlight through the Xe tube 24. Thereby, the flashlight illuminates the main subject. A part of the flashlight reflected by the main subject is incident upon the CCD image sensor 5 through the taking lens 4 as well as the light control sensor 25. Then, the received light amount in the light control sensor 25 is integrated in the light control circuit 26. Prior to the second exposure, the system controller 2 determines a flashlight completion level to obtain the proper exposure amount based on the aperture value and the photographic sensitivity in the second exposure. When the integrated amount reaches the flashlight completion level, light control circuit 26 stops flashlight emission of the Xe tube 24. Thereby, under the determined aperture value in the second exposure, the main subject is exposed by the CCD image sensor 5 with the proper exposure amount according to the determined photographic sensitivity.

When the temporary photographic sensitivity, which is calculated based on the subject distance, does not satisfy the formula (4), the actual photographic sensitivity is set lower than the temporary photographic sensitivity. In that case, the received light amount of the light control sensor 25 does not reach the emission completion level, so that the flash device emits the flashlight in full emission. Accordingly, the exposure amount of the main subject becomes less than the proper amount.

When the image data obtained in the first exposure is stored into the buffer memory 12, the gain according to the photographic sensitivity in the second exposure is set in the amplifier 8. The system controller 2 reads the white balance adjustment value according to the flashlight from ROM 2a, and sets it in the WB circuit 10. Then, the system controller 2 controls the driver 6 to transfer the charge in each pixel, so that the image signal is input from the CCD image sensor 5. The amplifier amplifies the image signal by the gain according to the photographic sensitivity in the second exposure. Thereby, the image signal level changes to the level to which the photographic sensitivity in the second exposure has been applied.

After amplified in the amplifier 8, the image signal is converted to the image data by the A/D converter 9, and is input in the WB circuit in sequence. Since the white balance adjustment value for the flashlight is set in the WB circuit 10, image data is corrected such that the subject illuminated by the flashlight obtains the proper white balance. Thereafter, corrected image data is written in the buffer memory 12 through the data processing circuit 11.

When image data of two frames obtained in the first and the second exposures is respectively written in the buffer memory 12, the data processing circuit 11 reads and adds both image data. Thereby, a composite image is created by synthesizing the images exposed in the first and the second exposures. The density of the composite image is corrected by a digital gain process of the data processing circuit 11. Thus, the main subject obtains the proper density even if the main subject is overexposed due to available light. When the digital gain processing is completed, the composite image is subject to the normal image processing. Thereafter, synthesized image data of the composite image is compressed, sent to an interface circuit 17, and written in a memory card 16.

As described above, the white balance of the background exposed by available light in the first exposure is properly adjusted according to the light source of available light. The second exposure is carried out with the exposure value that is lower by two or more steps compared to the proper exposure amount of the background, so that the exposure amount of the main subject by available light becomes very small. Therefore, even when the white balance of the image obtained in the second exposure is properly adjusted to the flashlight, there is no color fog and disagreeable color failure caused by the available light.

When the available light illuminates the main subject, for example, in a room or outdoors during daytime, the main subject is exposed with the proper exposure amount in the first exposure. The main subject becomes overexposed when the exposure amount by the flashlight has been added. However, the density correction is applied to the main subject in the digital gain process to obtain the proper density. Accordingly, an ideal image with proper brightness and color balance both in the background and the main subject is obtained.

In the above embodiment, the first exposure is carried out by available light, and the second exposure is carried out by the flashlight. However, the sequence may be carried out in the reverse order. In that case, the possibility is high that the exposure time by the available light is longer than the exposure time by the flashlight. If the subject or the photographer thinks that the photography is completed when they see the flashlight emission, the subject or the photographer moves in the next exposure to cause the camera shake or subject shake. Therefore, it is preferable to carry out the exposure by available light first, and then the exposure by the flashlight as described in the above embodiment.

The combination of the photographic sensitivity, the aperture value, and the shutter speed can be determined by any method as long as it satisfies the above conditions. The photographic sensitivity, the aperture value, and the shutter speed can be determined previously as a program according to the brightness of the background and the subject distance.

Figure 6:
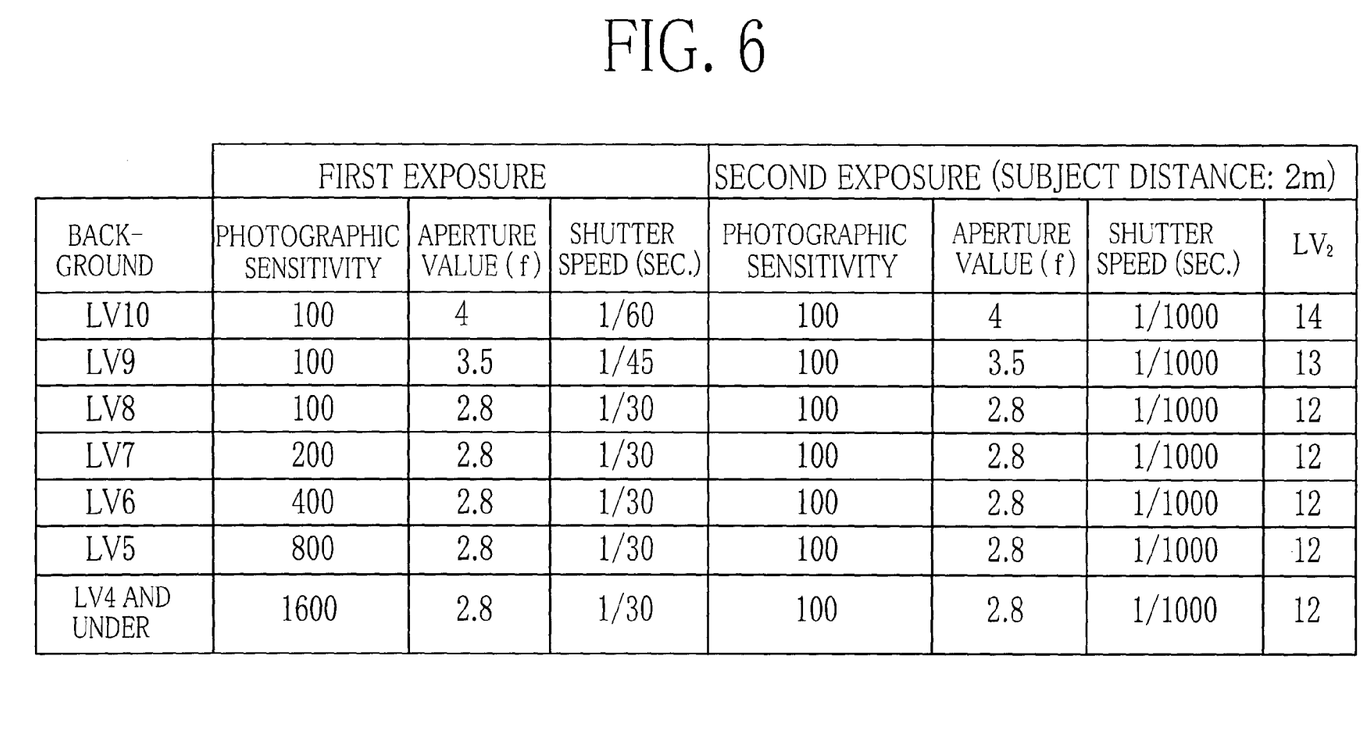
FIG. 6 is a table showing set values of the photographic sensitivity, the aperture value, and the shutter speed.

FIG. 6 shows an example of a program of the photographic sensitivity, the aperture value, and the shutter speed of the first and the second exposures at the subject distance of 2 m when the settings in the digital camera are as follows: the full aperture value is f/2.8, the upper limit of the shutter speed, with which a synchronization with the flashlight is possible, is 1/1000 sec.; the lower limit of the shutter speed, in consideration of the camera shake, is 1/30 sec.; the standard sensitivity is ISO 100; the upper limit of the photographic sensitivity is ISO 1600 in the first exposure; and maximum flashlight amount is GNo. 10.2(IS100·m).

When the background brightness is LV 10, the photographic sensitivity of ISO 100, the aperture value of f/4, and the shutter speed of 1/60 sec. are set in the first exposure. As the background brightness becomes lower than LV 10, the aperture value is gradually decreased from f/4.0 according to the decrease in the brightness. The shutter speed is also gradually decreased while keeping the photographic sensitivity at ISO 100.

When the background brightness is LV 8, the aperture value is set at full aperture of f/2.8, and the shutter speed is set at the lower limit of 1/30 sec. in consideration of the camera shake under the photographic sensitivity of ISO 100. When the brightness of the background becomes lower than LV 8, the photographic sensitivity is increased while the aperture value is kept at f/2.8 and the shutter speed is kept at 1/30 sec.

When the brightness of the background is LV 4, the photographic sensitivity is set at ISO 1600, the aperture value is set at f/2.8, and the shutter speed is set at 1/30 sec. Even if the brightness of the background becomes lower than LV 4, this combination of the photographic sensitivity, the aperture value, and the shutter speed, is used.

Thus, the combination of the photographic sensitivity, the shutter speed, and the aperture value, is determined in order to obtain the proper exposure amount within the range of LV10–LV4. When the brightness of the background is higher than LV 10, the flashlight photography mode automatically shifts to the normal photography mode to carry out normal photography.

In the second exposure, for example, when the subject distance is 2 m, the photographic sensitivity is fixed at ISO 100 and the shutter speed is fixed at 1/1000 sec. The same aperture value as that in the first exposure is used in the second exposure. Thereby, the second exposure is carried out by applying the photographic sensitivity, the aperture value, and the shutter speed that achieve underexposure state by 2 EV or more compared to the proper exposure amount of the background. The subject distance is set to be equal to or less than the effective distance of the flashlight. Thus, the combination of the photographic sensitivity, aperture value, and the shutter speed is determined such that the main subject is exposed with the proper exposure amount by the flashlight.

As for other subject distance, the same combination of the aperture value and the shutter speed, that are used at the subject distance of 2 m, is applied. In other words, the aperture value is determined to be the same as that in the first exposure. The shutter speed is determined at 1/1000 sec. Under this condition, the photographic sensitivity is determined to make the subject distance equal to or less than the effective distance of the flashlight. Thus, the photographic conditions in the second exposure are programmed.

Figure 7:
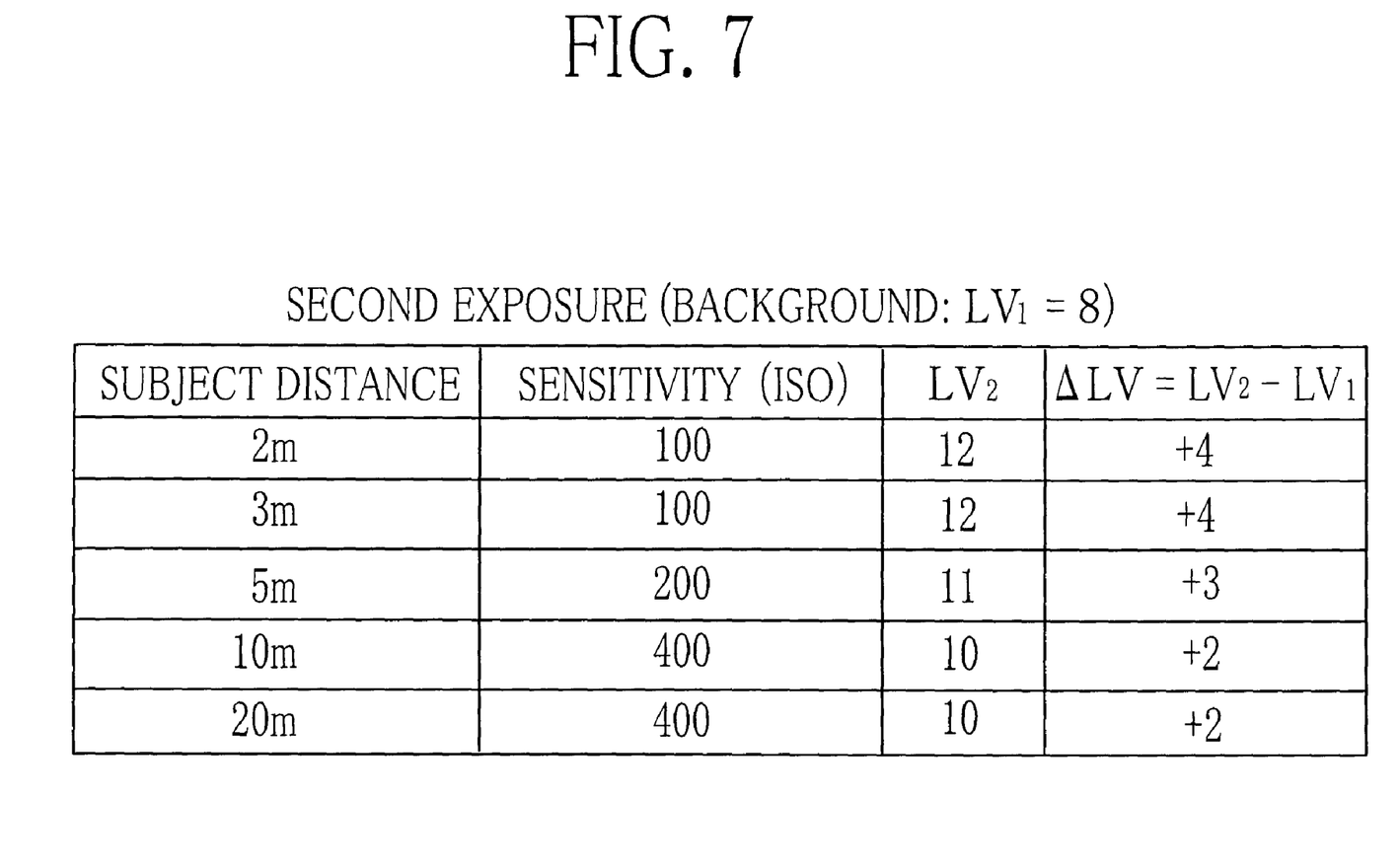
FIG. 7 is a table showing the relationship between a subject distance, the photographic sensitivity, and a light value for the second exposure.

When the brightness of the background is LV8, for example, as shown in FIG. 7, the photographic sensitivity is determined to be ISO 100 if the subject distance is 2 m or 3 m. However, when the subject distance is 5 m, the photographic sensitivity is determined to be ISO 200, because the subject distance does not become equal to or less than the effective distance of the flashlight with the aperture value of f/2.8 and the photographic sensitivity of ISO 100. The subject distance becomes equal to or less than the effective distance of the flashlight when the subject distance is 10 m and the photographic sensitivity is ISO 800, and when the subject distance is 20 m and the photographic sensitivity is ISO 1600. However, in such settings, the underexposure value by 2 EV or more compared to the background brightness cannot be achieved in the second exposure. Therefore, the photographic sensitivity in the second exposure is determined to be ISO 400.

Although the present invention has been described with respect to the preferred embodiment, the present invention is not to be limited to the above embodiment, but, on the contrary, various modifications will be possible to those skilled in the art without departing from the scope of claims appended hereto.

What is claimed is:

1. A digital still camera for carrying out a first exposure without a flashlight and a second exposure with a flashlight, said digital still camera comprising:
a photometric device for measuring subject brightness;
exposure determining circuit for determining exposure conditions in said first exposure to obtain proper exposure amount according to said subject brightness measured by said photometric device, and for determining exposure conditions in said second exposure to satisfy the following formula;

$$AV_1+TV_1-SV_1+2 \leq AV_2+TV_2-SV_2,$$

wherein $SV_1, AV_1,$ and $TV_1$ represent each APEX value of a photographic sensitivity, an aperture value, and a shutter speed in said first exposure, and $SV_2$ $AV_2,$ and $TV_2$ represent each APEX value of said photographic sensitivity, said aperture value, and said shutter speed in said second exposure;
a white balance adjustment circuit for adjusting white balance of an image obtained in said first exposure with a parameter according to available light, and for adjusting said white balance of said image obtained in said second exposure with a parameter according to flashlight; and
an image process circuit for creating a composite image by synthesizing images obtained in said first exposure and said second exposure.

2. A digital still camera as recited in claim 1, wherein said image process circuit corrects density of said composite image.

3. A digital still camera as recited in claim 2, wherein said second shutter speed is equal to or less than 1/500 sec.

4. A digital still camera as recited in claim 2, wherein the upper limit of said first photographic sensitivity is determined within a range from ISO 640 to ISO 1600.

5. A digital still camera as recited in claim 2, said exposure determining circuit determines said exposure conditions to satisfy following formulae;

$$AV_1+TV_1-SV_1+5 \leq 6$$

$$AV_2+TV_2-SV_2+5 \geq 10.$$

6. A digital still camera as recited in claim 2, further comprising a distance measuring device for measuring a subject distance of a main subject,
wherein said exposure determining circuit determines said photographic sensitivity in said second exposure such that said subject distance remains within a flashlight effective distance,
wherein when following formula is not satisfied, said exposure determining means decreases said photographic sensitivity of said second exposure to satisfy said formula;

$$AV_1+TV_1-SV_1+2 \leq AV_2+TV_2-SV_2.$$

7. An imaging method for carrying out first exposure without a flashlight and a second exposure with a flashlight, and obtaining a composite image by synthesizing images obtained in said first and second exposures, said imaging method comprising the steps of:
measuring subject brightness;
determining exposure conditions in said first exposure to obtain proper exposure amount according to said subject brightness;
determining exposure conditions in said second exposure to satisfy the following formula;

$$AV_1+TV_1-SV_1+2 \leq AV_2+TV_2-SV_2,$$

wherein $SV_1, AV_1,$ and $TV_1$ represent each APEX value of a photographic sensitivity, a first aperture value, and a shutter speed in said first exposure, and $SV_2, AV_2,$ and $TV_2$ represent each APEX value of said photographic sensitivity, said second aperture value, and said second shutter speed in said second exposure;
adjusting white balance of said image obtained in said first exposure by a parameter according to available light; and
adjusting said white balance of said image obtained in said second exposure by a parameter according to flashlight.

8. An imaging method as recited in claim 7, further comprising the step of correcting density of said composite.

9. An imaging method as recited in claim 8, wherein said second shutter speed is equal to or less than 1/500 sec.

10. An imaging method as recited in claim 8, wherein the upper limit of said first photographic sensitivity is determined within said range from ISO 640 and ISO 1600.

11. An imaging method as recited in claim 8, further comprising the step of:
determining said exposure conditions to satisfy the following formulae, $$AV_1+TV_1-SV_1+5 \leq 6$$

$$AV_2+TV_2-SV_2+5 \geq 10.$$

12. An imaging method as recited in claim 8, further comprising the steps of:
measuring the subject distance of a main subject;
determining said photographic sensitivity in said second exposure such that said subject distance remains within a flashlight effective distance; and decreasing said photographic sensitivity in said second exposure to satisfy the following formula, when said formula is not satisfied, $$AV_1+TV_1-SV_1+2 \leq AV_2+TV_2-SV_2.$$

13. An exposure decision method for determining exposure conditions in a first exposure without a flashlight and in a second exposure with a flashlight, said exposure decision method comprising the steps of:

measuring subject brightness;

determining exposure conditions in said first exposure to obtain proper exposure amount according to said subject brightness;

determining exposure conditions in said second exposure to satisfy the following formula;

$$AV_1+TV_1-SV_1+2 \leq AV_2+TV_2-SV_2,$$

wherein $SV_1$, $AV_1$, and $TV_1$ represent each APEX value of a photographic sensitivity, an aperture value, and a shutter speed in said first exposure, and $SV_2$, $AV_2$, and $TV_2$ represent each APEX value of said photographic sensitivity, said aperture value, and said shutter speed in said second exposure.

* * * * *